2,909,433

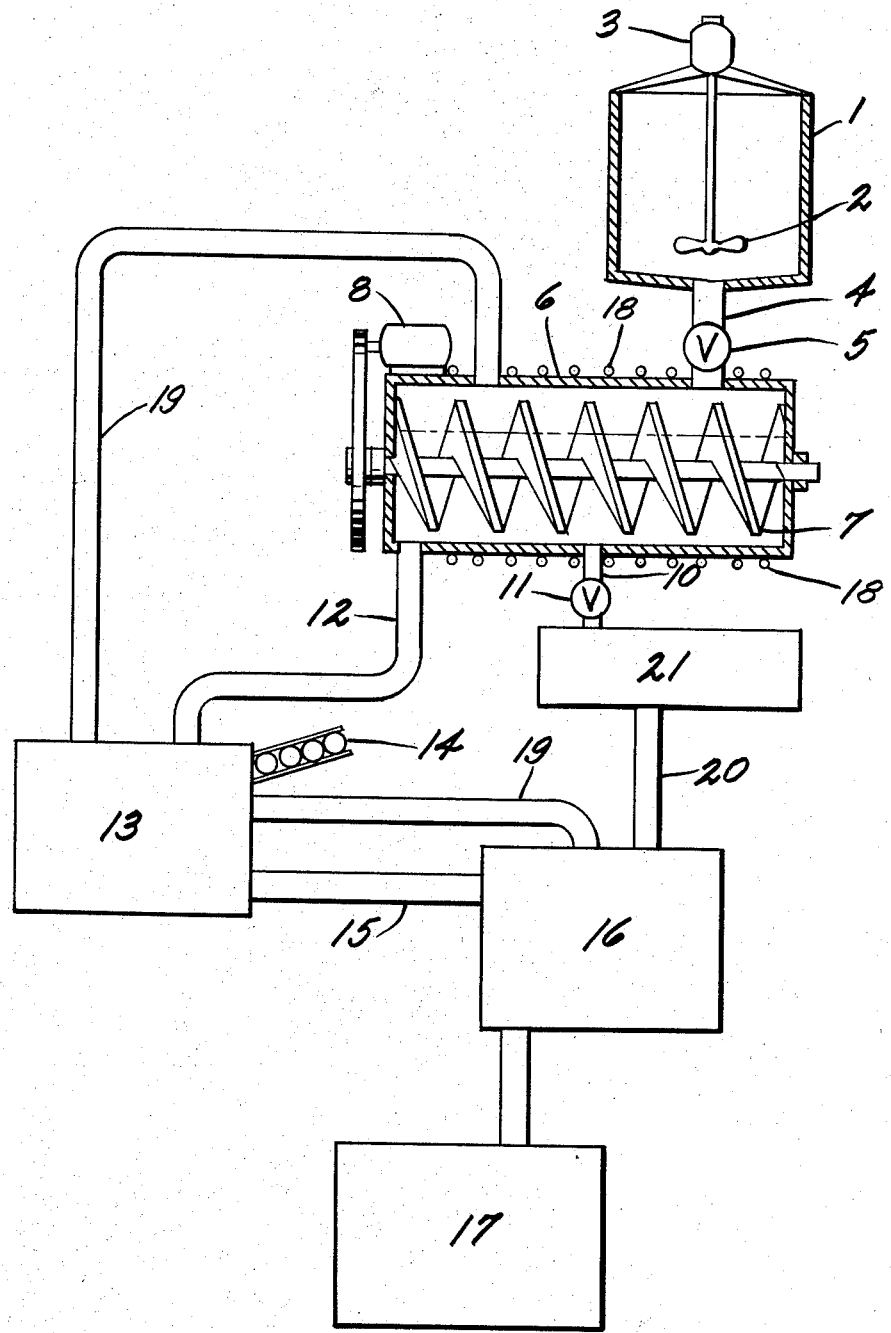

METHOD OF PREPARING AND HANDLING ICE CREAM, SHERBET, ICES AND THE LIKE

Willard L. Morrison, Lake Forest, Ill., assignor to The Union Stock Yard and Transit Company of Chicago, Chicago, Ill., a corporation of Illinois Application April 10, 1957, Serial No. 652,019

8 Claims. (Cl. 99—136)

My invention relates to a new and improved method of preparing, handling and distributing frozen foodstuffs such as ice cream, sherbets, ices and the like and has for one object to provide a method which will greatly expedite the manufacture of such foodstuffs.

Another object is to provide a method which will substantially reduce the expense of manufacture of such foodstuffs.

Another object is to greatly increase the storage life and greatly decrease deterioration in storage.

Another object is to insure the arrival on the table for consumption of such foodstuffs in superior condition.

Such foodstuffs as ice cream, sherbets, etc., include flavoring, solids and liquids. The liquid may include water, milk, vegetable fats, other dairy products, fruit juices, aromatic oils or other edible ingredients. Such frozen foods are churned or paddled and aerated so that as they freeze, the ice particles are of small size and fine grain and there is a substantial amount of air or over run churned into the product. Such foods when melted are of lesser volume by the extent of the over run than the food as it appears on the table. This increase in volume or over run results normally from churning the mixture in the presence of air under pressure so that a substantial quantity of air is trapped in and about and between the fine frozen particles.

The raw liquid mixture which may have solids in suspension is churned in a receptacle, the walls of which are cooled far below the freezing temperature of the material. The churning means prevent adhesion of the material to or scrapes the frozen material from the cold walls and brings the material repeatedly into contact with the walls as freezing takes place. Churning also breaks down the particles as they freeze to prevent bulk solidification and provide a granular smooth material.

When the frozen food has been frozen and churned to the desired consistency such that it will still flow, it is poured into a suitable receptacle which is placed in a hardening room where the temperature is far below the churning temperature to set or harden it. After hardening has completed the frozen food may be stored at a somewhat higher temperature below the danger point, usually little if any above zero degrees F.

When so stored, especially when stored in the usual receptacle which is not vapor tight, there is always a certain measure of vapor migration from the foodstuffs. This results in some measure of desiccation, especially of the outer layers so that deterioration in storage is a serious problem, the material tends to become mealy and sometimes unpleasant in taste.

I propose without substantial change in churning and mixing the product to expand it to produce the overrun, not by churning air into the mass but by injecting into the mass liquid nitrogen. If the nitrogen is injected for example at atmospheric pressure, it will be at about —320° F. and the heat of the foodstuffs will vaporize and expand it to some six hundred times the liquid volume. The nitrogen will permeate the mass. This makes it less necessary to paddle or force overrun air into the mass. The extraction of heat from the foodstuff to furnish the latent heat to vaporize the nitrogen will result in cooling from the inside, thus greatly decreasing the time during which the foodstuffs are at the relatively high freezing temperature heretofore necessary. The resultant product looks, feels and tastes just like ice cream with air overrun, the nitrogen being inert and tasteless.

When the frozen food has reached the desired consistency, I propose to place it in small cans in general the type of can heretofore used for the storage and shipment of frozen orange juice and the like; such cans may for example be approximately two inches in diameter and four inches long. This can will be immediately sealed so that the frozen foodstuff can then be placed in the hardening room and cooled and frozen to the desired standard low temperature, the can containing the frozen food and nitrogen with little if any oxygen.

Each can will contain one or two or more servings as the case may be, the idea being that once the can is opened, its entire contents will be used because if only part of the contents is used, deterioration immediately commences.

When such cans are stored under freezing conditions, for example zero degrees temperature, no change in consistency or character will take place for a practically indefinite storage period. When the can is withdrawn from frozen storage its contents will be too hard for convenient consumption. Because the can is round and because its size is known, it may be placed on the kitchen table exposed to ambient temperature, say 70°, for thirty minutes for example. Upon opening it will be found that the entire contents of the can has warmed and softened to the point at which it is satisfactory for use on the table.

There is a direct and definite relationship between the storage temperature, the temperature to which it is exposed after storage and the time during which it is exposed to room temperature. Since household freezers habitually operate at approximately zero degrees F., since room temperature is approximately 70° F. and since the size of can and weight of contents is known, the can may be marked with a label which instructs the housewife to take it out of a zero degrees F. freezer, put it on a table at 70° F., let it stand for say thirty minutes, open it and serve it.

This would not be satisfactory if the can is above a certain predetermined size because if it takes too long for heat to soften the center of the can we would have a situation where the outer boundaries would be too soft but starting with a can of the general size and type above referred to, slight variations in size, temperature and time are permissible without substantial deterioration of the product.

My invention is illustrated more or less diagrammatically in the accompanying flow sheet wherein like parts are indicated by like characters throughout the specification and drawing.

A mixing receptacle 1, open at the top so that the various ingredients may be placed in it, has a mixing paddle 2 driven by a motor 3. A duct 4 controlled by valve 5 leads to the votator or churn 6. The paddle 7 driven by motor 8 agitates the contents of the churn. The churn may be open or closed as the case may be. Liquid nitrogen is discharged into the votator beneath the level of the mixture through duct system 10 from any suitable source of liquid nitrogen controlled by valve 11. As the mix is churned, it is cooled by the liquid nitrogen, the liquid nitrogen evaporating, permeating the mass, escaping above the mass to maintain above the level an atmosphere of nitrogen, thus excluding air. The discharge duct 12 conducts the frozen material to a filling station 13, where containers 14 are filled with the frozen ice cream. The containers 14 are then carried by conveyor 15 to the hardening room 16 whence after hardening they are discharged to storage at 17.

Under some circumstances the rotator will be cooled by cooling coils 18 or other cooling means, receiving a refrigerant from any suitable source of power not indicated to cool the mass from the outside as well as from the inside.

If the churn is a closed vessel, the pressure generated by the nitrogen as it gasifies may be relied upon to assist in urging the frozen foodstuff to the filling station. Nitrogen may in gaseous form be conducted from the votator 6 through ducts 19 and 20 to the filling station and the hardening room or to the storage room if desired so that the cold of the nitrogen will not be wasted.

If desired, the spent nitrogen—still far below ambient temperature—may be conducted through a duct 20 to a reliquefier 21 which may supply the liquid nitrogen to the votator.

I claim:

1. The method of preparing frozen foods selected from the group consisting of ice cream, ices and sherbets which consists of churning the mix and while churning freezing it by injecting into the mix at substantially atmospheric pressure at temperature far below the temperature of the mix liquefied nitrogen and continuing such churning and injection until the mix reaches temperature slightly below the freezing point of water.

2. The method of preparing frozen foods selected from the group consisting of ice cream, ices and sherbets which consists of churning the mix in a cooling zone, injecting into the mix at substantially atmospheric pressure while it is being churned, liquid nitrogen and maintaining in the zone above the mix, an atmosphere of the resulting gaseous nitrogen.

3. The method of preparing frozen foods selected from the group consisting of ice cream, ices and sherbets which consists of churning the mix at substantially atmospheric pressure, cooling it during the churning and injecting into the mix liquid nitrogen whereby the nitrogen is gasified and churned into the mix.

4. The method of preparing frozen foods selected from the group consisting of ice cream, ices and sherbets which consists of churning the mix at substantially atmospheric pressure, injecting into the mix at substantially atmospheric pressure cold boiling liquid nitrogen and churning the gas resulting from the vaporization of the liquid into the mix at substantially atmospheric pressure.

5. The method of preparing frozen foods selected from the group consisting of ice cream, ices and sherbets which consists of churning the mixture in a pressure tight zone, injecting cold boiling liquid nitrogen at substantially atmospheric pressure into the zone as it is churned and when the mix has reached a temperature slightly below freezing, causing the pressure generated by the gas evaporated by the mix to expel the mixture from the zone.

6. The method of preparing and handling frozen foods selected from the group consisting of ice cream, ices and sherbets which consists of churning and cooling the mixture in a nitrogen atmosphere and injecting cold boiling liquid nitrogen at substantially atmospheric pressure into the mix as it is being churned and whereby the heat of the mix evaporates the nitrogen to maintain the nitrogen atmosphere, then discharging the frozen mixture from the zone, packaging it in relatively small air tight portable storage packages in the presence of nitrogen within the package.

7. The method of preparing and handling frozen foods selected from the group consisting of ice cream, ices and sherbets which consists of churning and cooling the mix, injecting a cold boiling liquid at substantially atmospheric pressure into the mix as it is being churned, discharging the mix with nitrogen overrun into and sealing it in a gas tight package of such size as to contain approximately two servings of the food, then subjecting the package to a temperature far below the freezing temperature of water to harden it.

8. The method of preparing and handling frozen foods selected from the group consisting of ice cream, ices and sherbets which consists of churning and freezing the ice cream in the presence of nitrogen, the nitrogen being injected into the mix as a liquid at substantially atmospheric pressure, then sealing the liquid in a portable gas tight package, then cooling the package far below the freezing temperature and then storing it at a temperature in the order of zero degrees F.

References Cited in the file of this patent

UNITED STATES PATENTS

| 625,280 | Walker | May 16, 1899 |
| 1,440,011 | Hosman | Dec. 26, 1922 |
| 2,618,939 | Morrison | Nov. 25, 1952 |
| 2,713,253 | Chandler | July 19, 1955 |

OTHER REFERENCES

Food Technology, November 1954, p. 492.